(12) United States Patent
Almers et al.

(10) Patent No.: US 11,307,635 B2
(45) Date of Patent: Apr. 19, 2022

(54) FIELD-POWERED BIOMETRIC DEVICE, AND METHOD OF CONTROLLING A FIELD-POWERED BIOMETRIC DEVICE

(71) Applicant: FINGERPRINT CARDS AB, Gothenburg (SE)

(72) Inventors: Peter Almers, Limhamn (SE); David Carling, Mölndal (SE); Rolf Sundblad, Ljungsbro (SE); Nicholas Weiner, Bristol (GB); Benjamin Willcocks, Bristol (GB)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 170 days.

(21) Appl. No.: 16/609,573

(22) PCT Filed: Apr. 24, 2018

(86) PCT No.: PCT/SE2018/050418
§ 371 (c)(1),
(2) Date: Oct. 30, 2019

(87) PCT Pub. No.: WO2018/203799
PCT Pub. Date: Nov. 8, 2018

(65) Prior Publication Data
US 2020/0064901 A1 Feb. 27, 2020

(30) Foreign Application Priority Data
May 5, 2017 (SE) .................................. 1750548-8

(51) Int. Cl.
*G06F 1/32* (2019.01)
*G06F 1/3234* (2019.01)
(Continued)

(52) U.S. Cl.
CPC .............. *G06F 1/3243* (2013.01); *G06F 1/10* (2013.01); *G06F 1/263* (2013.01); *G06F 1/3206* (2013.01);
(Continued)

(58) Field of Classification Search
None
See application file for complete search history.

(56) References Cited

U.S. PATENT DOCUMENTS

| 5,487,084 A | 1/1996 | Lindholm |
| 9,425,644 B1 * | 8/2016 | Dellacona ............... H01F 41/06 |

(Continued)

FOREIGN PATENT DOCUMENTS

| CN | 102567146 B | 1/2014 |
| EP | 2528021 A1 | 11/2012 |

(Continued)

OTHER PUBLICATIONS

Wayback Machine Capture of "Introduction to Schmitt Trigger", Mar. 7, 2019, Components101 (Year: 2019).*

(Continued)

*Primary Examiner* — Danny Chan
(74) *Attorney, Agent, or Firm* — RMCK Law Group, PLC

(57) ABSTRACT

A method of controlling operation of a field-powered biometric device comprising biometric acquisition circuitry, processing circuitry controllable to transition between a first functional state having a first power consumption and a second functional state having a second power consumption lower than the first power consumption, and power management circuitry. The method comprises the steps of monitoring, by the power management circuitry, a property indicative of a supply voltage to the processing circuitry; controlling, when the monitored property indicates that the (Continued)

supply voltage has fallen to a first threshold voltage, the processing circuitry to transition from the first functional state to the second functional state; and controlling, when the monitored property indicates that the supply voltage has increased to a second threshold voltage higher than the first threshold voltage, the processing circuitry to transition from the second functional state to the first functional state.

13 Claims, 4 Drawing Sheets

(51) Int. Cl.
| | |
|---|---|
| *G06F 1/10* | (2006.01) |
| *G06F 1/26* | (2006.01) |
| *G06F 1/3206* | (2019.01) |
| *G06F 11/30* | (2006.01) |
| *G06F 21/32* | (2013.01) |
| *G06F 21/60* | (2013.01) |
| *G06F 21/62* | (2013.01) |
| *G06K 9/00* | (2022.01) |
| *G06K 19/07* | (2006.01) |
| *H04B 5/00* | (2006.01) |

(52) U.S. Cl.
CPC ...... *G06F 11/3024* (2013.01); *G06F 11/3062* (2013.01); *G06F 21/32* (2013.01); *G06F 21/602* (2013.01); *G06F 21/6245* (2013.01); *G06K 9/00013* (2013.01); *G06K 19/07* (2013.01); *H04B 5/0037* (2013.01)

(56) References Cited

U.S. PATENT DOCUMENTS

| | | | | |
|---|---|---|---|---|
| 2005/0207624 | A1* | 9/2005 | Ehlers | G06K 19/0718 |
| | | | | 382/124 |
| 2010/0039234 | A1* | 2/2010 | Soliven | H04B 5/02 |
| | | | | 340/10.1 |
| 2012/0284529 | A1* | 11/2012 | Crowe | G06F 21/6227 |
| | | | | 713/189 |
| 2014/0149765 | A1 | 5/2014 | Jessup et al. | |
| 2014/0253190 | A1* | 9/2014 | Chen | G06F 1/26 |
| | | | | 327/143 |
| 2016/0291625 | A1* | 10/2016 | Tripathi | G06F 1/28 |
| 2018/0268274 | A1* | 9/2018 | Lowe | G06K 7/10158 |
| 2019/0028564 | A1* | 1/2019 | Singamsetty | H04L 63/205 |

FOREIGN PATENT DOCUMENTS

| | | |
|---|---|---|
| WO | 2016003831 A1 | 1/2016 |
| WO | 2017025481 A1 | 2/2017 |

OTHER PUBLICATIONS

Adiono, T. et al., "Highly stable analog front-end design for NFC smart card," Analog Integr Circ Sig Process, 92:71-79, 2017.

Broutas, P. et al., "A Low Power RF Harvester for a Smart Passive Sensor Tag With Integrated Antenna," Sensors and Actuators A, vol. 176, 2012, pp. 34-45.

PCT International Search Report and Written Opinion dated Sep. 7, 2018 for International Application No. PCT/SE2018/050418, 12 pages.

* cited by examiner

FIELD-POWERED BIOMETRIC DEVICE, AND METHOD OF CONTROLLING A FIELD-POWERED BIOMETRIC DEVICE

CROSS-REFERENCE TO RELATED APPLICATIONS

This application is a 371 U.S. National Stage of International Application No. PCT/SE2018/050418, filed Apr. 24, 2018, which claims priority to Swedish Patent Application No. 1750548-8, filed May 5, 2017. The disclosures of each of the above applications are incorporated herein by reference in their entirety.

FIELD OF THE INVENTION

The present invention relates to a field-powered biometric device, and to a method of controlling a field-powered biometric device.

BACKGROUND OF THE INVENTION

Biometric systems have recently been introduced as means for increasing the convenience and security of personal electronic devices, such as mobile phones etc. Fingerprint sensing systems, in particular, are now included in a large proportion of all newly released personal communication devices, such as mobile phones.

Lately, efforts have also been made to introduce biometric systems, such as fingerprint sensing systems, in other devices that may have less computing power and/or available energy. Examples of such other devices are so-called smart cards, door locks, and devices in the so-called internet of things (IoT) category etc.

Field-powered devices is one particularly demanding category of devices for which the introduction of biometric capability would be beneficial. Since operation of a field-powered device is dependent on power harvested from an RF-excitation field, the issue of power management is important. This is particularly the case for a field-powered device with a relatively complex functionality, such as a field-powered biometric device that may, for example, need to be capable of authenticating the user of the field-powered biometric device on demand.

WO 2017/025481 describes a method of power optimization in an RFID device, comprising harvesting power from a radio-frequency excitation field using an antenna, powering a biometric authentication unit and an RFID communication module using the harvested power from the antenna; monitoring the voltage of the power supplied to the biometric authentication unit, and controlling a clock speed of a processing unit of the biometric authentication unit based on the monitored voltage by operating the processing unit at a higher clock speed when a high voltage level is detected and at a lower clock speed when a low voltage level is detected.

There appears to be room for an improved field-powered biometric device, in particular a field-powered biometric device providing for more stable operation.

SUMMARY

In view of above-mentioned and other drawbacks of the prior art, it is an object of the present invention to provide an improved field-powered biometric device, in particular a field-powered biometric device providing for more stable operation.

According to a first aspect of the present invention, it is therefore provided a field-powered biometric device using electrical power harvested from a time-varying electrical field for acquiring and performing operations on a biometric representation of a user, the field-powered biometric device comprising: biometric acquisition circuitry for acquiring the biometric representation of the user; processing circuitry connected to the biometric acquisition circuitry for receiving the biometric representation from the biometric acquisition circuitry and performing the operations on the biometric representation, the processing circuitry being controllable to transition between a first functional state having a first power consumption and a second functional state having a second power consumption lower than the first power consumption; power management circuitry connected to the processing circuitry, the power management circuitry being configured to: monitor a property indicative of a supply voltage to the processing circuitry; control, when the monitored property indicates that the supply voltage has fallen to a first threshold voltage, the processing circuitry to transition from the first functional state to the second functional state; and control, when the monitored property indicates that the supply voltage has changed from the first threshold voltage to a second threshold voltage higher than the first threshold voltage, the processing circuitry to transition back from the second functional state to the first functional state.

The above-mentioned operations on the biometric representation of the user may, for example, include various kinds of, per se, known image processing and image enhancement operations, as well as operations related to biometric enrollment and authentication.

In embodiments, the biometric acquisition circuitry may comprise a fingerprint sensing arrangement, such as a capacitive fingerprint sensing arrangement. In other embodiments, the biometric acquisition circuitry may comprise a sensor configured to capture an image of another biometric representation of the user, such as the iris, or the retina, or the face etc.

The above-mentioned property indicative of the supply voltage provided to the processing circuitry may, in embodiments, be the supply voltage itself. The supply voltage may then be monitored directly or indirectly. Alternatively, the above-mentioned property may be a relation between a supplied current and a consumed current, or another voltage that is related to (such as proportional to) the supply voltage. As a further alternative, the above-mentioned property may be a relation between a field strength of the electrical field and the consumed current.

The present invention is based upon the realization that the operation of a field-powered biometric device can be automatically adapted to the available electrical power harvested from an electrical field, by—directly or indirectly—monitoring the supply voltage provided to the processing circuitry and controlling the processing circuitry between functional states depending on the magnitude of the supply voltage.

In a field-powered biometric device according to embodiments of the present invention, the clock frequency to the processing circuitry can be allowed to be constant, which provides for more stable (such as temperature stable) operation and simplified system design.

In various embodiments of the fingerprint sensing system according to the present invention, the processing circuitry may be configured to pause the operations on the biometric representation when being transitioned from the first functional state to the second functional state; and resume the operations on the biometric representation when being transitioned back from the second functional state to the first functional state.

Hereby, the transitions between the first and second functional states will generally only result in a somewhat longer processing time needed to perform the above-mentioned operations. In most cases, this is likely to remain unnoticed by the user.

According to embodiments, the field-powered biometric device may further comprise an energy storage device arranged and configured to: receive current and store electrical energy when an available electrical power harvested from the electrical field is greater than a required electrical power needed for operation of the field-powered biometric device; and provide current to the processing circuitry, thereby reducing the stored electrical energy, when the available electrical power harvested from the electrical field is less than the required electrical power needed for operation of the field-powered biometric device.

The energy storage device may advantageously comprise a capacitor connected in parallel with the processing device, so that an increase in the amount of energy stored in the capacitor will result in an increased supply voltage to the processing circuitry.

When the available power harvested from the electrical field is insufficient to power the processing circuitry in the first functional state (during a sufficiently long time), the supply voltage will drop to the first threshold voltage, and the processing circuitry will be controlled to transition from the first functional state to the second functional state. If the available power harvested from the electrical field is greater than the power needed to power the processing circuitry in the second functional state, excess energy will be stored in the capacitor, resulting in an increasing supply voltage. When the supply voltage rises to the second threshold voltage, which is higher than the first threshold voltage, the processing circuitry is controlled back to the first functional state and resumes operation on the biometric representation.

According to various embodiments, the field-powered biometric device may further comprise clock signal providing circuitry connected to the processing circuitry for providing a clock signal to the processing circuitry, the clock signal providing circuitry being configured to provide the clock signal having a constant clock frequency to the processing circuitry, regardless of whether the processing circuitry is in the first functional state or in the second functional state. As compared to clock signal providing circuitry that is controllable to change the clock frequency depending on the available energy, it is considerably simpler to design clock signal providing circuitry being configured to provide the clock signal having a constant clock frequency to the processing circuitry, regardless of whether the processing circuitry is in the first functional state or in the second functional state. Furthermore, correct timing of operations performed by the field-powered biometric device is easier to achieve. For instance, circuitry other than the processing circuitry can continue to operate with the substantially constant clock frequency.

To provide for even more variability in the power consumption of the field-powered biometric device, the power management circuitry may be further configured to disconnect, when the monitored property indicates that the supply voltage has fallen to the first threshold voltage, the clock signal providing circuitry from the processing circuitry, or from parts of the processing circuitry; and reconnect, when the monitored property indicates that the supply voltage has changed from the first threshold voltage to the second threshold voltage, the clock signal providing circuitry to the processing circuitry, or the above-mentioned parts of the processing circuitry.

The field-powered biometric device according to embodiments of the present invention may further comprise energy harvesting circuitry connected to the biometric acquisition circuitry, to the processing circuitry, and to the power management circuitry, for interacting with the time-varying electrical field to transform wireless energy from the electrical field to AC-power in the field-powered biometric device; and converting the AC-power to DC-power.

The energy harvesting circuitry may comprise a coil for interacting with the time-varying electrical field, and a rectifier connected to the coil.

In embodiments, the field-powered biometric device may further comprise voltage limiting circuitry arranged and configured to limit the supply voltage to the processing circuitry to a maximum supply voltage higher than the second threshold voltage. Such voltage limiting circuitry may, for example, be implemented using a, per se, known shunt connected in parallel with the processing circuitry.

According to various embodiments, the processing circuitry may be controllable to a third functional state in which the processing circuitry saves settings to prepare for shutdown; and the power management circuitry may be further configured to: control, when the monitored property indicates that the supply voltage falls below a third threshold voltage lower than the first threshold voltage, the processing circuitry to transition from the second functional state to the third functional state. In the third functional state, the processing circuitry may, for example, save information about a present operational state, to be able to resume operation when the energy supply situation is later improved. In addition, the processing circuitry may be configured to erase sensitive information in the third functional state, such as any cryptographic and/or biometric data stored by the field-powered biometric device. These measures may reduce the risk of a possible attacker accessing sensitive information.

According to a second aspect of the present invention, there is provided a method of controlling operation of a field-powered biometric device comprising biometric acquisition circuitry, processing circuitry controllable to transition between a first functional state having a first power consumption and a second functional state having a second power consumption lower than the first power consumption, and power management circuitry, the method comprising the steps of monitoring, by the power management circuitry, a property indicative of a supply voltage to the processing circuitry; controlling, when the monitored property indicates that the supply voltage has fallen to a first threshold voltage, the processing circuitry to transition from the first functional state to the second functional state; and controlling, when the monitored property indicates that the supply voltage has increased to a second threshold voltage higher than the first threshold voltage, the processing circuitry to transition from the second functional state to the first functional state.

Further embodiments of, and effects obtained through this second aspect of the present invention are largely analogous to those described above for the first aspect of the invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the field-powered biometric device according to the present invention are mainly described with reference to a field-powered biometric device including a fingerprint sensing arrangement for acquiring a biometric representation in the form of a fingerprint image. Furthermore, the field-powered biometric device is described as included in a contactless smart card (which is itself a field-powered biometric device). It should be noted that field-powered biometric devices including various other kinds of biometric acquisition circuitry fall within the scope defined by the claims. Moreover, the field-powered biometric device according to embodiments of the present invention is not limited to being included in (or being) a contactless smart card.

Figure 1A:
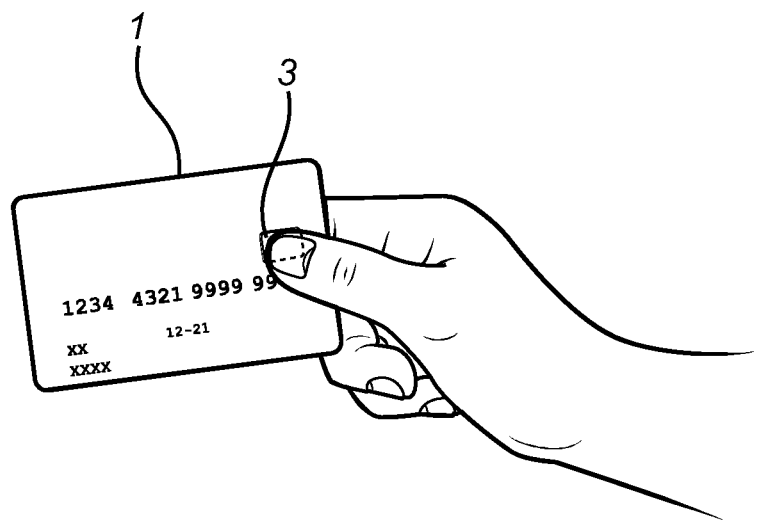
FIG. 1a is an illustration of an exemplary field-powered biometric device according to an embodiment of the present invention, in the form of a so-called contactless smart card.

FIG. 1a schematically illustrates a first example embodiment of a field-powered biometric device according to the present invention, in the form of a so-called contactless smart card 1 including a biometric module 3. It should be noted that the biometric module 3, is also a field-powered biometric device.

Figure 1B:
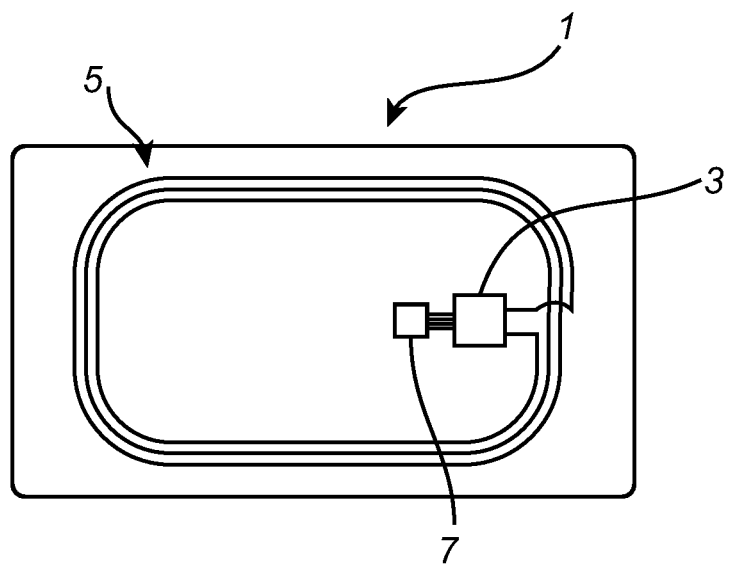
FIG. 1b is a schematic view of the smart card in FIG. 1a, when delaminated to reveal the functional parts of the smart card.

As is schematically shown in FIG. 1b, the smart card 1 additionally comprises an antenna 5, and a secure element 7. The antenna 5 is used for harvesting electrical power from a time-varying electrical field, and for wirelessly communicating with a remote device, such as a card reader (not shown), typically through load modulation. The secure element 7 may, for example, contain information for authorizing a transaction, and is connected to the biometric module 3. When the user is authenticated by the biometric module 3 (or by the biometric module 3 in co-operation with the secure element 7), the information contained in the secure element 7 may be unlocked and allowed to be wirelessly communicated to the card reader via the antenna 5.

Figure 2:
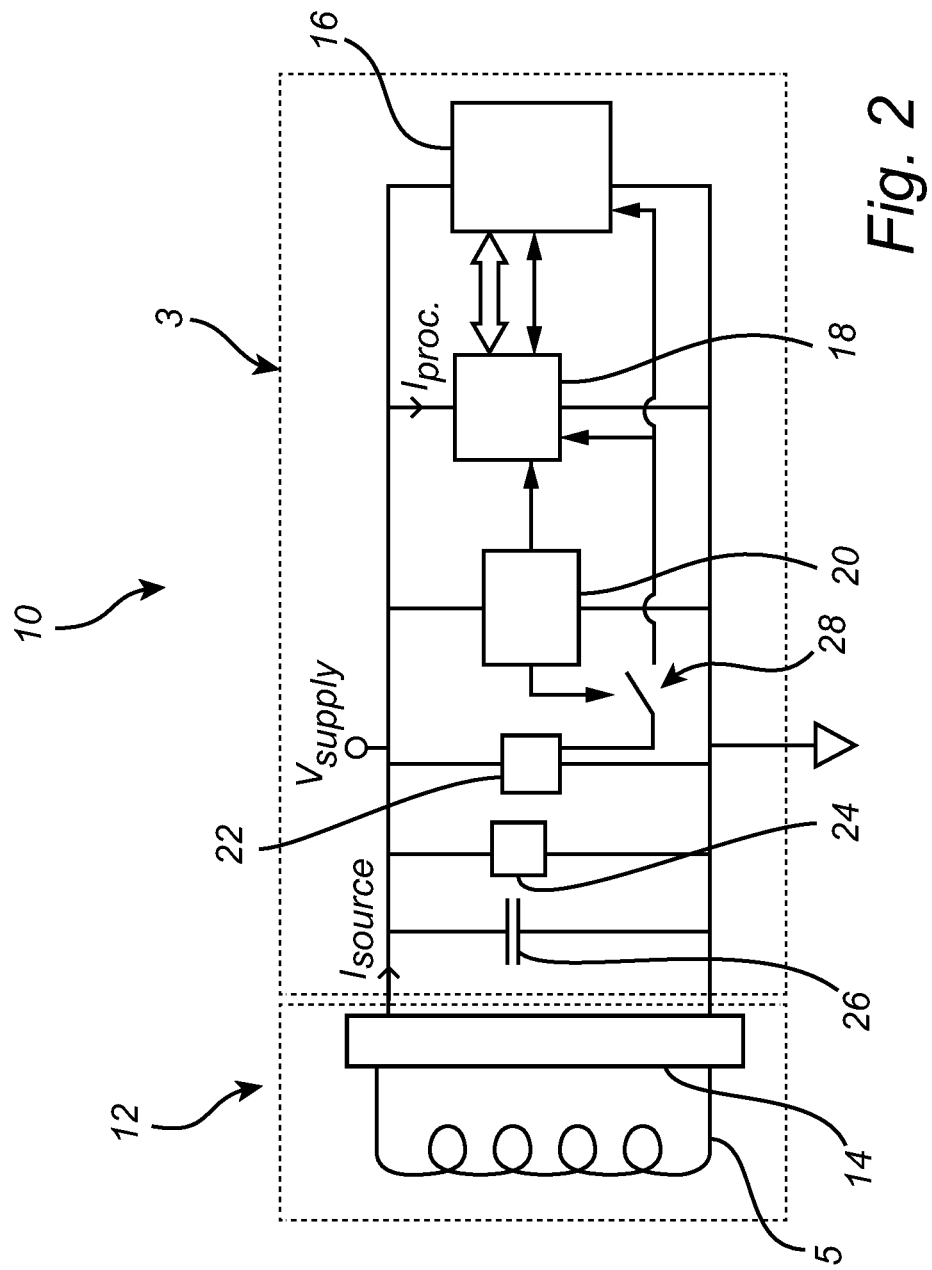
FIG. 2 is a schematic block diagram of a field-powered biometric device according to an embodiment of the present invention.

FIG. 2 is a schematic block diagram of a field-powered biometric system 10 including a power harvesting circuit 12 and a biometric module 3.

The power harvesting circuit 12 comprises a coil (antenna) 5, and a rectifier 14. The biometric module 3 comprises biometric acquisition circuitry, here in the form of a fingerprint sensor 16, processing circuitry, here in the form of a microprocessor 18, power management circuitry 20, clock signal providing circuitry, here in the form of an oscillator 22, voltage limiting circuitry, here in the form of a shunt 24, and an energy storage device in the form of a capacitor 26.

As is schematically indicated in FIG. 2, the fingerprint sensor 16, the microprocessor 18, the power management circuitry 20, the oscillator 22, the shunt 24 and the energy storage capacitor 26 are all connected in parallel with the rectifier 14 of the power harvesting circuit 12 to receive a rectified supply voltage $V_{supply}$ from the rectifier 14. The microprocessor 18 is coupled to the fingerprint sensor 16 to control operation of the fingerprint sensor 16 and to receive a biometric representation (a fingerprint representation) from the fingerprint sensor 16. The oscillator 22 is coupled to the microprocessor 18 and to the fingerprint sensor 16 to provide a clock signal having a substantially constant clock frequency to the microprocessor 18 and to the fingerprint sensor 16. The power management circuitry 20 is coupled to the microprocessor 18, and to a controllable switch 28 arranged between the oscillator 22, and the microprocessor 18 and the fingerprint sensor 16. The microprocessor 18 is controllable between at least a first functional state exhibiting a first power consumption and a second functional state exhibiting a second power consumption, lower than the first power consumption. In the first functional state, the microprocessor 18 may be in full operation and capable of performing various operations on a biometric representation received from the fingerprint sensor 16, and in the second functional state, the microprocessor 18 may be in a low-power state in which any ongoing operations may be paused and put on hold.

The power harvested from the electrical field by the power harvesting circuit 12 will depend on the electrical field strength. If the power harvested from the electrical field is greater than the power needed by the biometric module 3, the voltage output by the rectifier 14 will increase to a predefined maximum voltage $V_{max}$ limited by the shunt 24. As is well-known to one of ordinary skill in the art, a shunt allows current to flow through the shunt to thereby maintain the voltage at the voltage for which the shunt is designed.

Figure 3:
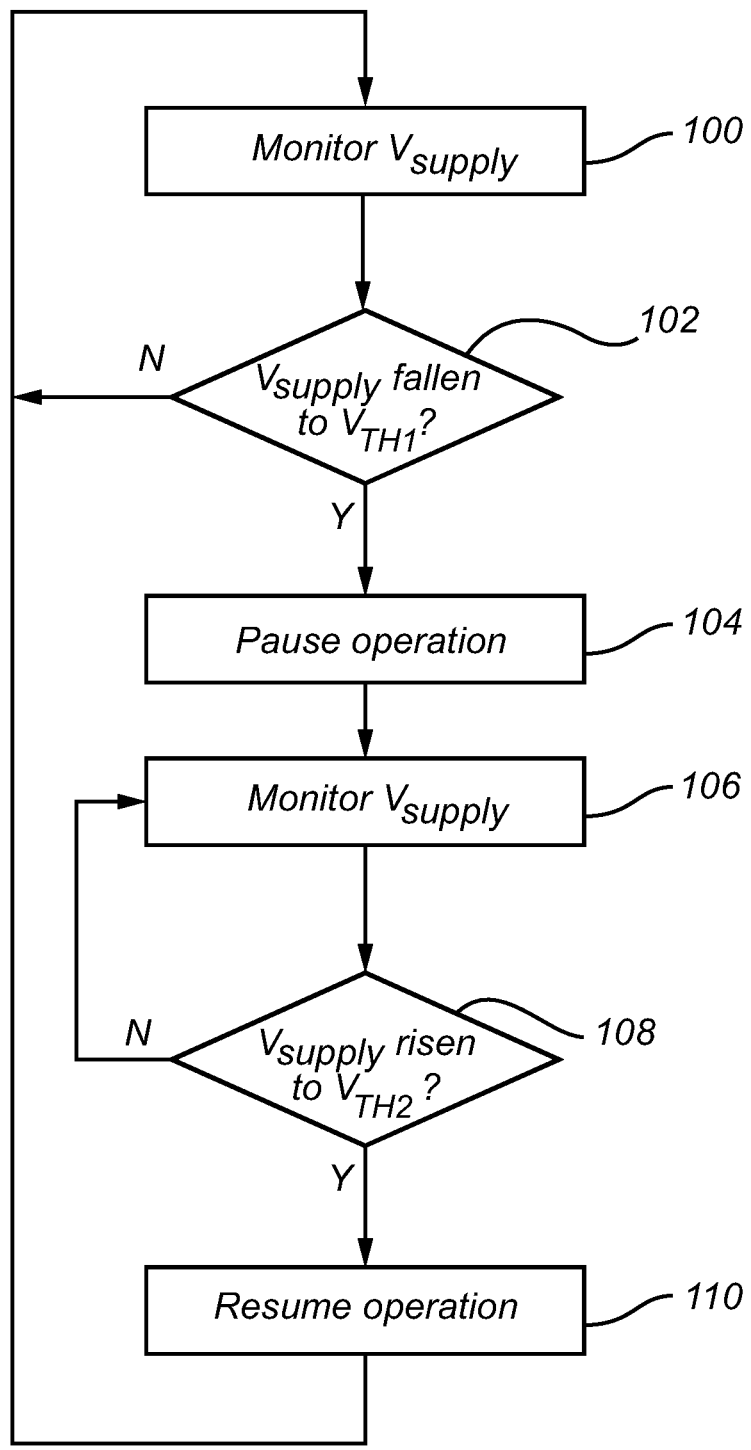
FIG. 3 is a flow-chart illustrating a method according to an embodiment of the present invention.
Figure 4:
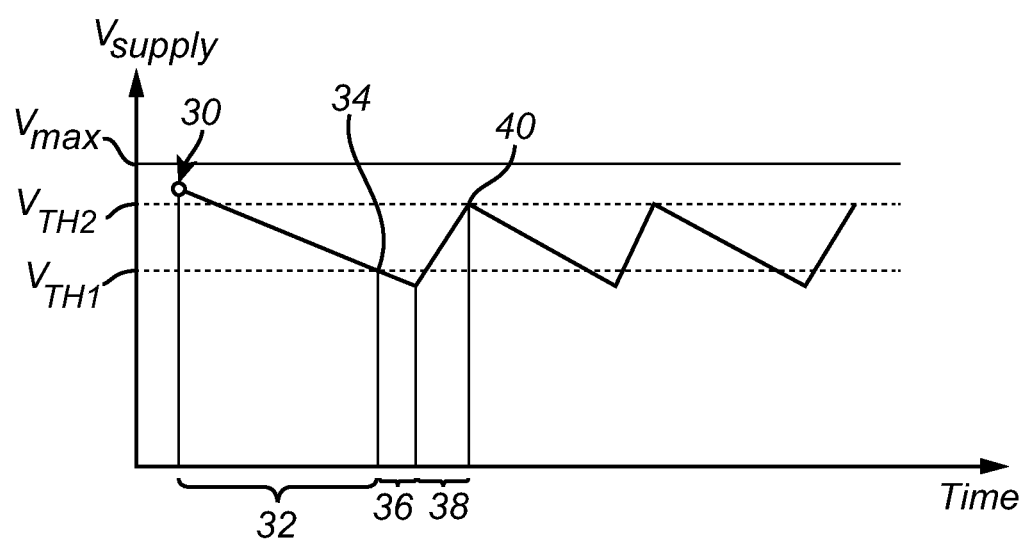
FIG. 4 is a diagram schematically illustrating operation of the field-powered biometric device in FIG. 2 in accordance with the method according to the flow-chart in FIG. 3.

A method according to an embodiment of the present invention will now be described with reference to the flow-chart in FIG. 3, and with additional reference, where applicable, to FIG. 2 and FIG. 4.

In a first step 100, the supply voltage $V_{supply}$ is monitored by the power management circuitry 20. To this end, the power management circuitry 20 may, for example, comprise at least one comparator. One input of such a comparator may be connected to the supply voltage $V_{supply}$ and the other input may be connected to circuitry controllable to provide one of at least two threshold voltages $V_{TH1}$ and $V_{TH2}$. Depending on the previous level of the supply voltage $V_{supply}$, such a comparator may be configured to compare the supply voltage $V_{supply}$ with either the first threshold voltage $V_{TH1}$ or the second threshold voltage $V_{TH2}$ (and/or any other threshold voltage being related to further functional modes of the microprocessor 18).

It is here assumed that the harvested power provided by the power harvesting circuit 12 is initially sufficient to power the biometric module 3 with the microprocessor 18 operating in its first functional state. This means that the microprocessor 18 is initially in its first functional state, that the supply voltage $V_{supply}$ is higher than the first threshold voltage $V_{TH1}$, and that the current $I_{proc}$ to the microprocessor is relatively high. The optional clock gating switch 28 in FIG. 2 is controlled by the power management circuitry 20 to be closed, so that the clock signal, with a substantially constant clock frequency, is provided to the microprocessor 18 and the fingerprint sensor 16. This initial point in time is indicated by the reference numeral 30 in the diagram in FIG. 4. The diagram in FIG. 4 is a somewhat simplified illustration of the supply voltage $V_{supply}$ over time for a situation when the power harvested from the electrical field by the power harvesting circuit 12 is not sufficient to support continuous operation of the biometric module 3.

It is determined, in step 102, if the supply voltage $V_{supply}$ has fallen to the first threshold voltage $V_{TH1}$. As long as this is not the case, the microprocessor 18 is allowed to remain in its first functional state and the supply voltage $V_{supply}$ is continuously monitored. This is indicated in FIG. 3 by the loop-back to from step 102 to step 100, and in the diagram in FIG. 4 by the time interval 32. If it is instead determined in step 102 that the supply voltage $V_{supply}$ has fallen to the first threshold voltage $V_{TH1}$, which is indicated to occur at the time indicated by reference numeral 34 in the diagram in FIG. 4, then the method proceeds to the subsequent step 104 and the power management circuitry 20 controls the microprocessor 18 to transition to the second functional state, for example the operations carried out by the microprocessor 18 may be paused. Optionally, as is schematically indicated in FIG. 2, the clock gating switch 28 may be opened to prevent clock signals from being provided to (parts of) the microprocessor 18 and/or the fingerprint sensor 16. As is schematically indicated in the diagram in FIG. 4, the transition from the first functional state to the second functional state is allowed to take a predefined (and/or configurable) number of clock cycles, as is indicated by the time period labeled 36 in the diagram in FIG. 4.

In the second functional state, the power consumption of the microprocessor 18 is considerably reduced. In other words, the current to the microprocessor 18 is considerably reduced. Then, the energy storage capacitor 26 in FIG. 2 is charged, resulting in an increasing supply voltage $V_{supply}$, as is indicated by the time period 38 in the diagram in FIG. 4. During this time period 38, the power management circuitry 22 monitors the increasing supply voltage $V_{supply}$ in step 106.

It is determined, in step 108, if the supply voltage $V_{supply}$ has risen to the second threshold voltage $V_{TH2}$. As long as this is not the case, the microprocessor 18 is allowed to remain in its second functional state and the supply voltage $V_{supply}$ is continuously monitored. This is indicated in FIG. 3 by the loop-back to from step 108 to step 106. If it is instead determined in step 108 that the supply voltage $V_{supply}$ has risen to the second threshold voltage $V_{TH2}$, which is indicated to occur at the time 40 in the diagram in FIG. 4, then the method proceeds to the subsequent step 110 and the power management circuitry 20 controls the microprocessor 18 to transition back to the first functional state so that the operations can be resumed. At the same time, or somewhat earlier, the power management circuitry may control the clock gating switch 28 to closed again, if applicable. The method then returns to step 100 and alternates between active time periods 32 and inactive (wait) time periods 38 as is schematically indicated in the diagram in FIG. 4. Provided that the time period 36 is very small compared to the time periods 32 and 38, the proportion of time spent processing closely approximates $I_{source}/I_{proc}$, where $I_{source}$ is the current provided by the power harvesting circuit 12.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A field-powered biometric device using electrical power harvested from a time-varying electrical field for acquiring and performing operations on a biometric representation of a user, said field-powered biometric device comprising:
    biometric acquisition circuitry for acquiring the biometric representation of the user;
    processing circuitry connected to said biometric acquisition circuitry for receiving the biometric representation from said biometric acquisition circuitry and performing said operations on the biometric representation, said processing circuitry being controllable to transition between a first functional state exhibiting a first power consumption and a second functional state exhibiting a second power consumption lower than said first power consumption;
    power management circuitry connected to said processing circuitry, said power management circuitry being configured to:
        monitor a property indicative of a supply voltage to said processing circuitry;
        control, when said monitored property indicates that said supply voltage has fallen to a first threshold voltage, said processing circuitry to transition from said first functional state to said second functional state; and
        control, when said monitored property indicates that said supply voltage has changed from said first threshold voltage to a second threshold voltage higher than said first threshold voltage, said processing circuitry to transition back from said second functional state to said first functional state, wherein:
    said processing circuitry is controllable to a third functional state in which said processing circuitry saves settings to prepare for shut-down to be able to resume operation when the supply voltage is later improved, and said processing circuitry erases cryptographic and/or biometric data stored by the field-powered biometric device in the third functional state; and
    said power management circuitry is further configured to:
        control, when said monitored property indicates that said supply voltage falls below a third threshold voltage lower than said first threshold voltage, said processing circuitry to transition from said second functional state to said third functional state.

2. The field-powered biometric device according to claim 1, wherein said processing circuitry is configured to:
    pause said operations on the biometric representation when being transitioned from said first functional state to said second functional state; and
    resume said operations on the biometric representation when being transitioned back from said second functional state to said first functional state.

3. The field-powered biometric device according to claim 1, further comprising an energy storage device arranged and configured to:
    receive current and store electrical energy when an available electrical power harvested from the electrical field is greater than a required electrical power needed for operation of said field-powered biometric device; and
    provide current to the processing circuitry when the available electrical power harvested from the electrical field is less than the required electrical power needed for operation of said field-powered biometric device.

4. The field-powered biometric device according to claim 3, wherein said energy storage device comprises a capacitor.

5. The field-powered biometric device according to claim 1, further comprising clock signal providing circuitry connected to said processing circuitry for providing a clock signal to said processing circuitry, said clock signal providing circuitry being configured to provide said clock signal with a constant clock frequency to said processing circuitry, regardless of whether the processing circuitry is in said first functional state or in said second functional state.

6. The field-powered biometric device according to claim 1, wherein said power management circuitry is further configured to:
 disconnect, when said monitored property indicates that said supply voltage has fallen to said first threshold voltage, said clock signal providing circuitry from said processing circuitry; and
 reconnect, when said monitored property indicates that said supply voltage has changed from said first threshold voltage to said second threshold voltage, said clock signal providing circuitry to said processing circuitry.

7. The field-powered biometric device according to claim 1, further comprising energy harvesting circuitry connected to said biometric acquisition circuitry, to said processing circuitry, and to said power management circuitry, for:
 interacting with said time-varying electrical field to transform wireless energy from the electrical field to AC-power in said field-powered biometric device; and
 converting said AC-power to DC-power.

8. The field-powered biometric device according to claim 7, wherein said energy harvesting circuitry comprises a coil for interacting with said time-varying electrical field, and a rectifier connected to the coil.

9. The field-powered biometric device according to claim 1, further comprising voltage limiting circuitry arranged and configured to limit said supply voltage to the processing circuitry to a maximum supply voltage higher than said second threshold voltage.

10. The field-powered biometric device according to claim 1, wherein:
 said processing circuitry comprises a cryptographic block; and
 said processing circuitry, in said third functional state, further erases any data in said cryptographic block.

11. The field-powered biometric device according to claim 1, wherein said biometric acquisition circuitry comprises a fingerprint sensing arrangement.

12. A method of controlling operation of a field-powered biometric device comprising biometric acquisition circuitry, processing circuitry controllable to transition between a first functional state having a first power consumption and a second functional state having a second power consumption lower than said first power consumption, and power management circuitry, said method comprising the steps of:
 monitoring, by said power management circuitry, a property indicative of a supply voltage to said processing circuitry;
 controlling, when said monitored property indicates that said supply voltage has fallen to a first threshold voltage, said processing circuitry to transition from said first functional state to said second functional state; and
 controlling, when said monitored property indicates that said supply voltage has increased to a second threshold voltage higher than said first threshold voltage, said processing circuitry to transition from said second functional state to said first functional state, wherein:
 said processing circuitry is controllable to a third functional state in which said processing circuitry saves settings to prepare for shut-down to be able to resume operation when the supply voltage is later improved, and said processing circuitry erases cryptographic and/or biometric data stored by the field-powered biometric device in the third functional state; and
 said method further comprises the step of:
 controlling, when said monitored property indicates that said supply voltage falls below a third threshold voltage lower than said first threshold voltage, said processing circuitry to transition from said second functional state to said third functional state.

13. The method according to claim 12, wherein:
 when said monitored property indicates that said supply voltage has fallen to the first threshold voltage, said processing circuitry is controlled to pause operations on a biometric representation of a user; and
 when said monitored property indicates that said supply voltage has changed from said first threshold voltage to the second threshold voltage, said processing circuitry is controlled to resume said operations on the biometric representation of the user.

* * * * *